(12) United States Patent
Kaplan

(10) Patent No.: US 11,307,372 B2
(45) Date of Patent: Apr. 19, 2022

(54) FIBER OPTICAL TERMINAL CROSS CONNECT CLOSURE

(71) Applicant: Steven E. Kaplan, Elyria, OH (US)

(72) Inventor: Steven E. Kaplan, Elyria, OH (US)

(*) Notice: Subject to any disclaimer, the term of this patent is extended or adjusted under 35 U.S.C. 154(b) by 0 days.

(21) Appl. No.: 16/899,224

(22) Filed: Jun. 11, 2020

(65) Prior Publication Data

US 2020/0333545 A1 Oct. 22, 2020

Related U.S. Application Data

(63) Continuation of application No. 15/986,408, filed on May 22, 2018, now Pat. No. 10,684,437.

(60) Provisional application No. 62/509,590, filed on May 22, 2017.

(51) Int. Cl.
*G02B 6/44* (2006.01)
*G02B 6/38* (2006.01)

(52) U.S. Cl.
CPC ......... *G02B 6/4453* (2013.01); *G02B 6/4447* (2013.01); *G02B 6/3897* (2013.01); *G02B 6/4454* (2013.01)

(58) Field of Classification Search
CPC .. G02B 6/4453; G02B 6/4447; G02B 6/3897; G02B 6/4454

USPC ........................................................ 385/135
See application file for complete search history.

(56) References Cited

U.S. PATENT DOCUMENTS

| 5,133,038 A | * | 7/1992 | Zipper | G02B 6/4248 174/50 |
| 10,684,437 B2 | * | 6/2020 | Kaplan | G02B 6/4453 |
| 2006/0222309 A1 | * | 10/2006 | Grubish | G02B 6/445 385/135 |
| 2009/0116807 A1 | * | 5/2009 | Fabrykowski | G02B 6/4452 385/135 |
| 2011/0249949 A1 | | 10/2011 | Griffiths et al. | |
| 2015/0309275 A1 | * | 10/2015 | Johnson | G02B 6/3814 385/136 |
| 2017/0199344 A1 | * | 7/2017 | Kowalczyk | G02B 6/3897 |

* cited by examiner

*Primary Examiner* — Jerry M Blevins
(74) *Attorney, Agent, or Firm* — Fay Sharpe LLP

(57) ABSTRACT

A connector closure for fiber optical cables includes a base portion having first and second compartments. One of the first and second compartments is designed to have a cover or door that allow selective access, while the other compartment signed for only authorized access. The connector closure features universal mounting arrangements, e.g., aerial, surface/wall, pedestal, or vault arrangements. Further, the closure may incorporate a splice enclosure.

15 Claims, 26 Drawing Sheets

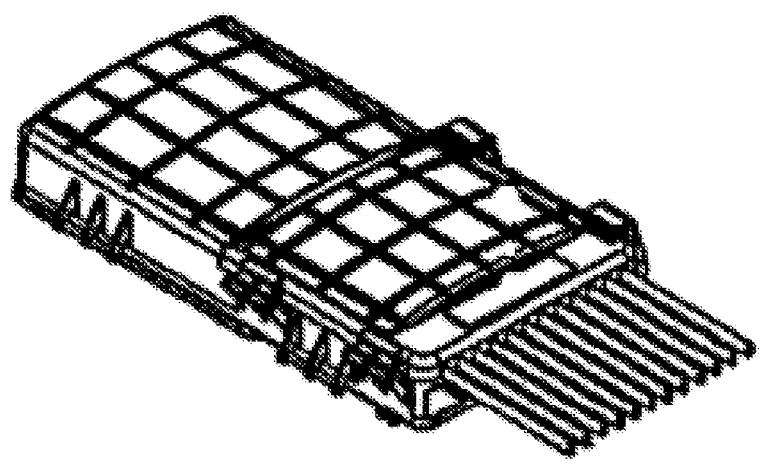
Fig. 18A
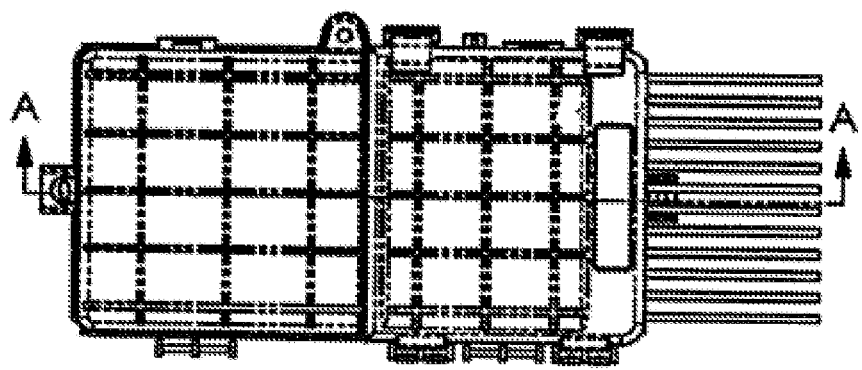
Fig. 18B
Fib. 18C

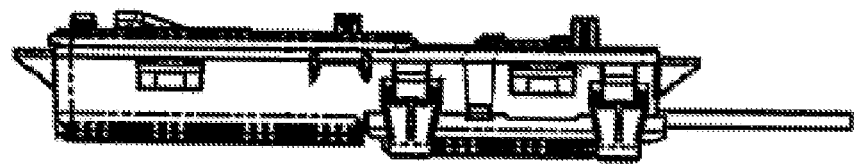
Fig. 18D
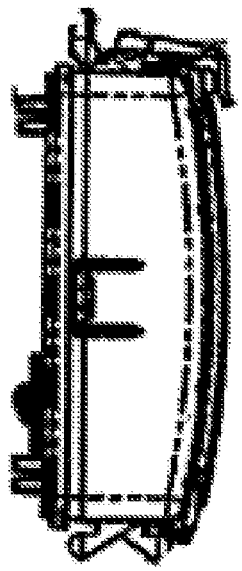 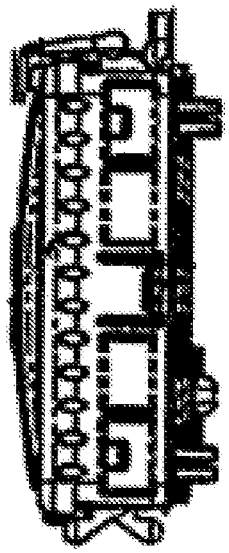
Fig. 18E  Fig. 18F
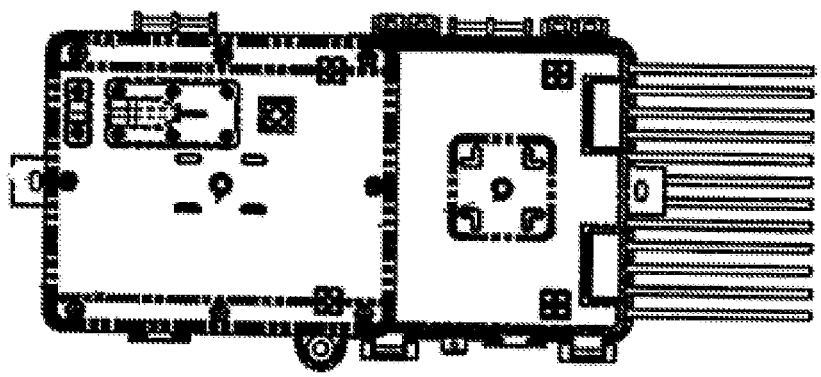
Fig. 18G

FIBER OPTICAL TERMINAL CROSS CONNECT CLOSURE

This application is a continuation application of U.S. Ser. No. 15/986,408 filed May 22, 2018, now allowed, and claims the priority benefit of U.S. provisional application Ser. No. 62/509,590, filed May 22, 2017, the entire disclosures of which are expressly incorporated herein by reference.

BACKGROUND

This invention relates to a fiber optical cross connect unit or closure, and more particularly to a closure with improved slack and fiber handling and optical cable capabilities.

It is known in the industry to provide a closure design. See, for example, U.S. Pat. No. 7,471,867, the entire disclosure of which is expressly incorporated herein by reference. However, there is a greater need for flexibility and improved features associated with the network and distribution aspects of a fiber closure.

The closure may be a kit arrangement that includes various options where features such as a splice tray, adapter panels, pigtails, strain relief features, a ground lug, etc. The rectangular, box-shaped closure includes a base that has a base wall and sidewalls extending therefrom to define a cavity. One or more cables are received through at least one of the sidewalls and extend into the closure cavity. Typically, a cover is secured (e.g., hinged) to the base to allow selective ingress and egress to the cavity of the closure.

It is desirable to minimize the size or dimensional footprint of the closure, yet achieve this reduced size without compromising functionality. For example, it is desirable that the closure provide organization of the input cable and individual optical fibers thereof, as well as sufficient volume for fusion splices (typically a splice tray accommodated therein to interconnect selected lines from the input cable to, for example, pigtails).

It is desirable to provide a modular cover that may enhance the organization functionality of other connector bases such that a splice connector, for example, could be modified with the cover to give the box added distribution features.

A need exists for an improved arrangement that reduces the size of the closure while simultaneously providing improved features and benefits relative to prior art arrangements.

SUMMARY

There is provided an improved connector closure that includes a secure network portion and an accessible distribution portion.

The connector closure includes improved universal features, enhanced sealing capabilities, and protects disconnected drop lines.

Further, the connector closure can be secured to a splice closure to maximize potential benefits of the closure.

The connector closure is available in different port configurations, e.g. 4, 8, in 12 port configurations, and allows pass through network designs in a compact size.

The connector closure is adaptable for use in aerial service, surface/wall mounting, pedestal service, or vault service.

The terminal provides for fast hookup and disconnect of drop cable field connections.

Another advantage relates to slack storage in the base of the closure, as well as slack storage management. The closure can be configured to have either one or two fiber entrance ports at the base of the closure and drop fiber installation is located in a separate compartment ensuring that the installer only comes into contact with the drop installation cables.

The closure allows the base of the closure to be expanded into a splicing unit, and since the closure is re-enterable, easy maintenance access is permitted for technicians to troubleshoot and connectorize each drop in the field.

Benefits and advantages of the present disclosure will become more apparent from reading and understanding the following detailed description.

BRIEF DESCRIPTION OF THE DRAWINGS

FIGS. 18A-18G (perspective, top, front, rear, left side, right side, and cross-sectional views along the lines A-A of FIG. 18 B), 19A-19C (perspective, another perspective, and cross-sectional views), 20A-20E (exploded top perspective, exploded bottom perspective, enlarged detail, and enlarged perspective views of cable) show additional views of a termination enclosure for an aerial configuration.

DETAILED DESCRIPTION

Figure 1:
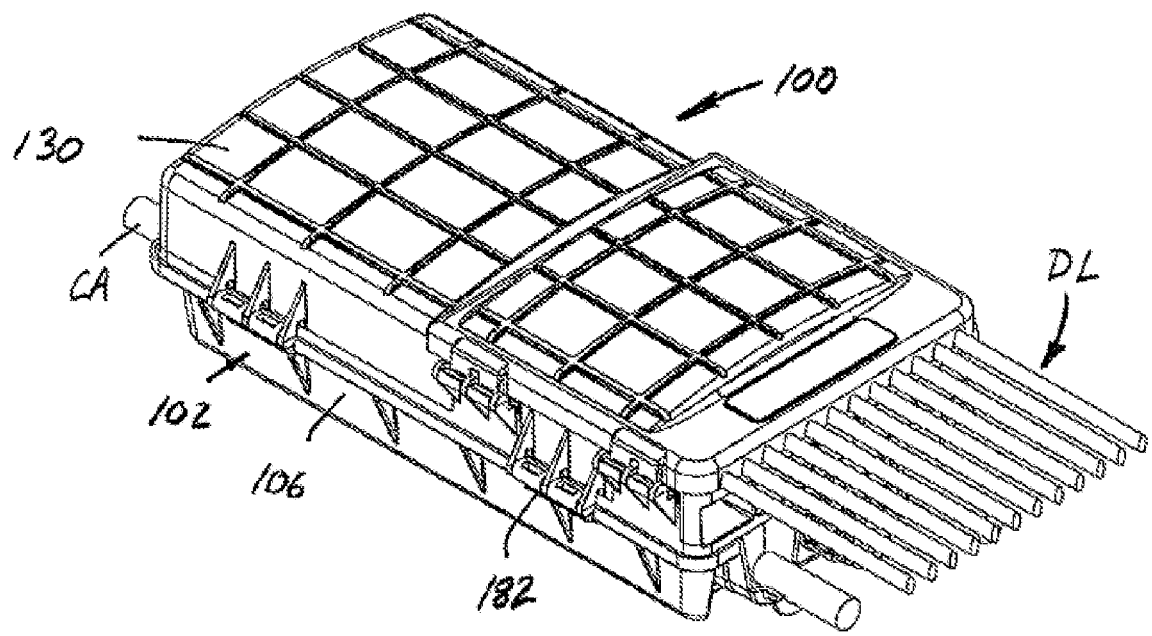
FIG. 1 is a perspective view of a combination closure that provides distribution access and selective network access.
Figure 2:
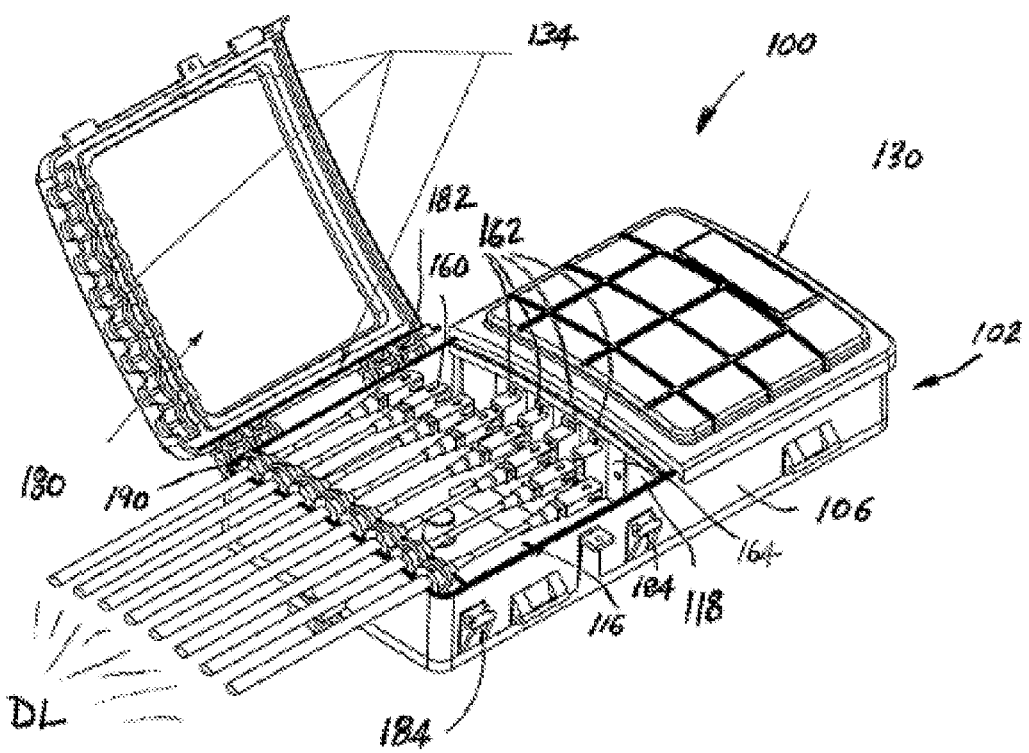
FIG. 2 is a perspective view of the combination closure with a cover closed over the network access portion, and a separate hinged cover for the distribution access portion shown in an open position, or a non-captive opening allows installation of a pre-connectorized drop cable without having to expose or secure the central strength member (CSM).

Turning initially to FIGS. 1-10, there is shown a fiber tap and patch closure, also referred to herein as a combination or connector closure, 100 formed of a rigid material such as a glass filled polypropylene or similar rigid, durable material that is designed to withstand the rigors of the environment such as temperature, UV light, and the need to allow selective access for patching or splicing, as well as ordered storage of individual fiber drops having connectors formed at one end. More particularly, the connector closure 100 includes a base portion 102 having a base wall 104 and a sidewall 106 extending around and perpendicularly from an external perimeter of the base wall. Formed in the base wall 104 are mounting features such as bosses 110 that receive threaded inserts or fasteners (not shown) for securing the closure 100 to a wall or planar surface (not shown), aerial mounting (secured to a fiber optic cable assembly), and/or pole (not shown). Mounting features 112 may be provided at opposite ends of the base wall 104 to secure the closure 100 to a pole in a conventional manner. Preferably, alternative mounting features 110 (FIG. 4), 112 (e.g., FIG. 6) are provided so that the connector closure 100 is universal in nature and can be assembled in the field as needed to fit the particular requirement (e.g., wall, aerial, or pole mounting) and without installers having to carry separate inventory of each type of mounting.

Figure 12:
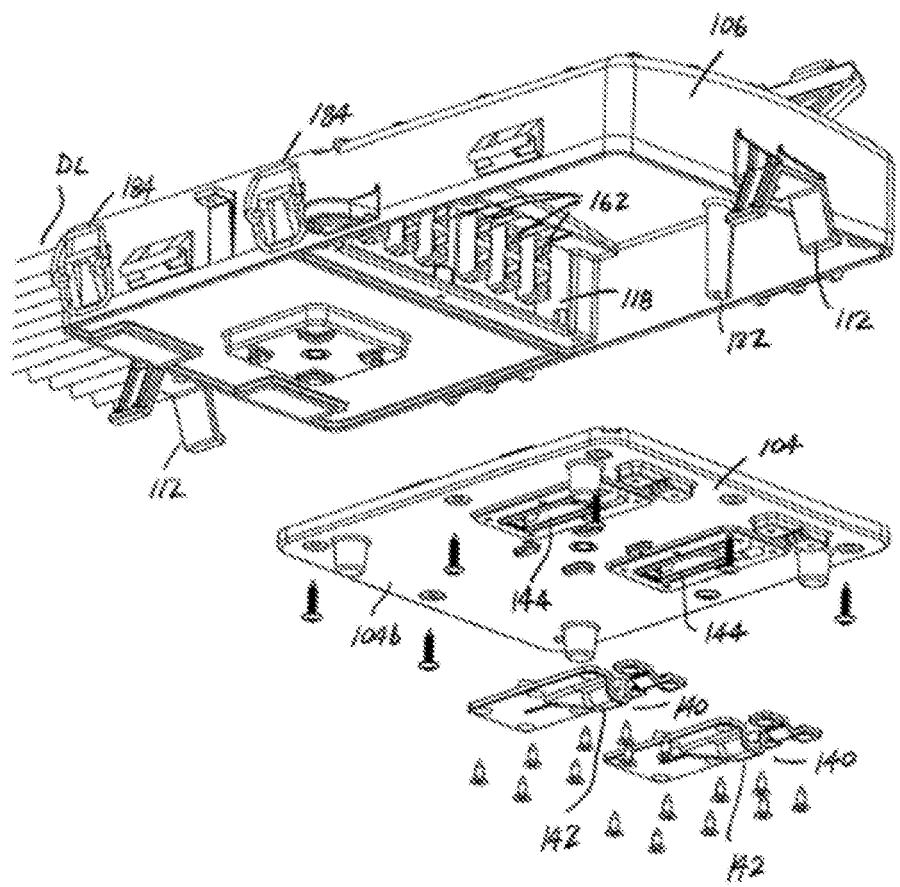
FIGS. 12 and 13 are perspective views illustrating a reversible bottom panel.
Figure 13:
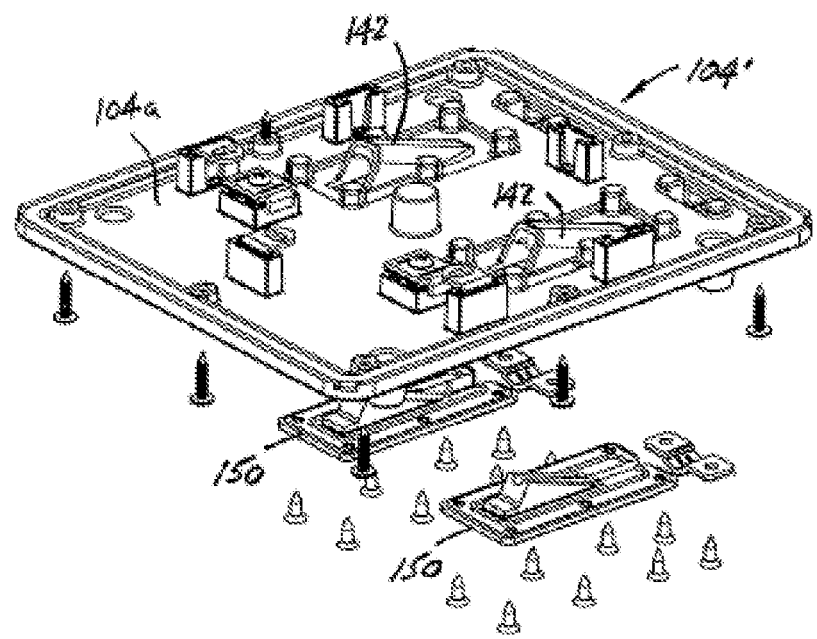

If desired, the base wall 104 can be formed as a removable base plate that is assembled to the sidewall 106 so that one surface 104a (FIG. 13) of the base plate 104 accommodates pedestal and wall mounting of the connector closure 100, while the opposite surface 104b (FIG. 12) of the base plate is suitable for aerial connection. By simply rotating the base plate 104' one hundred eighty (180°), the same component (base plate) can be used by an installer to provide universal mounting, i.e., either pedestal or wall mounting in one orientation, or aerial mounting in the other orientation.

Figure 3:
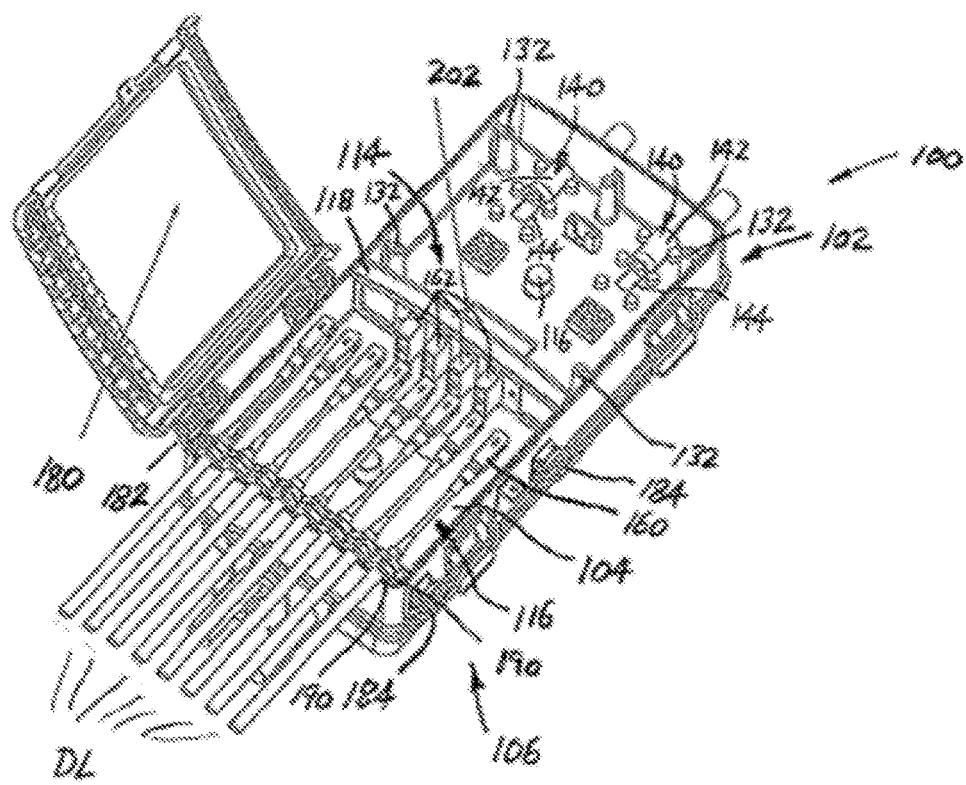
FIG. 3 is a perspective view of the combination closure with the cover removed from over the network access portion, and the hinged cover for the distribution access portion shown in an open position, and which can be used to contain distribution cables and thereby separate them from the mid span access section from the splice compartment.
Figure 4:
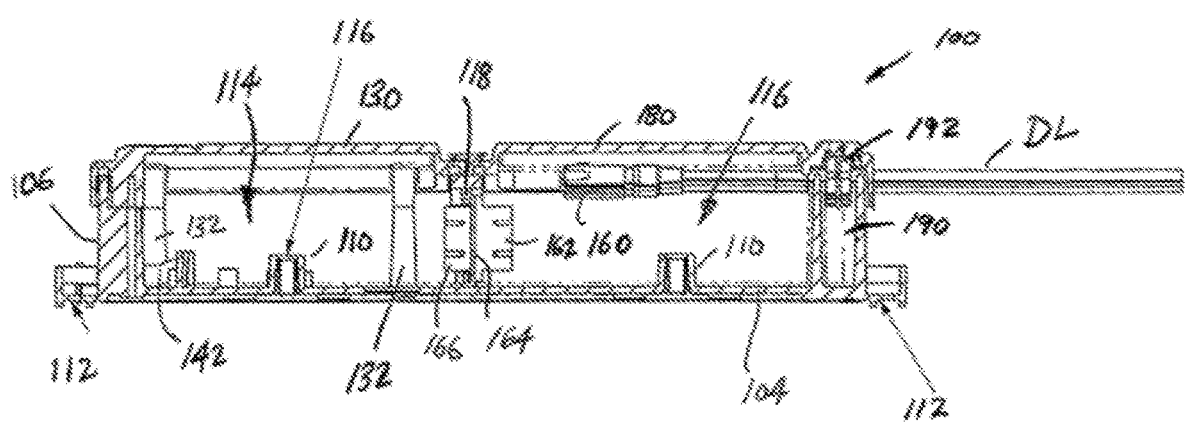
FIG. 4 is a cross-sectional view of the combination closure of FIG. 1 taken generally along a central longitudinal portion thereof, and where a bulkhead can be removed from the splice compartment or an angled bulkhead can be removed from the splice compartment.
Figure 5:
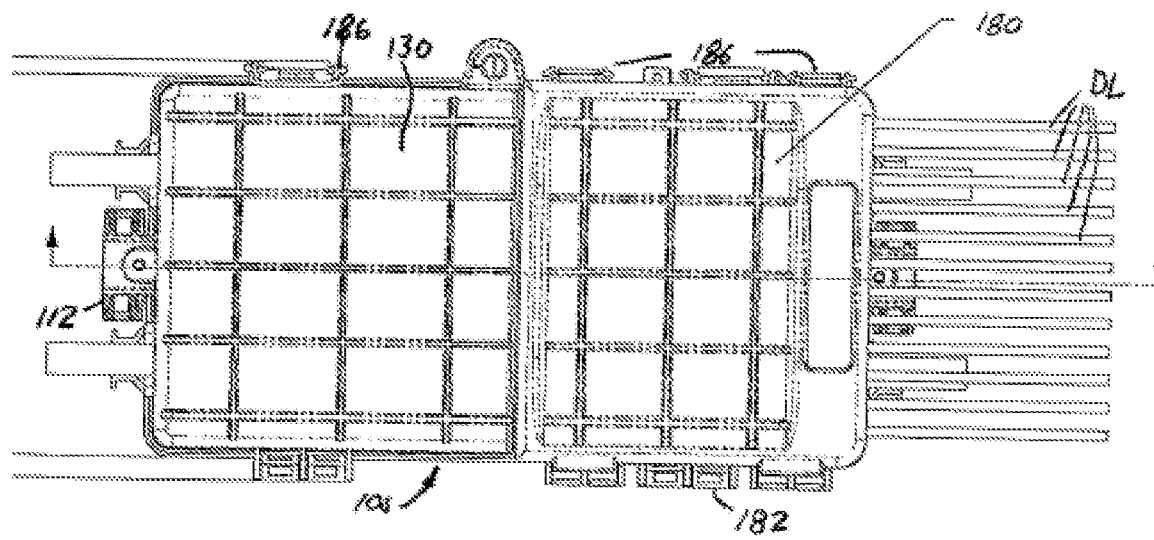
FIG. 5 is a top plan view of the combination closure.
Figure 6:
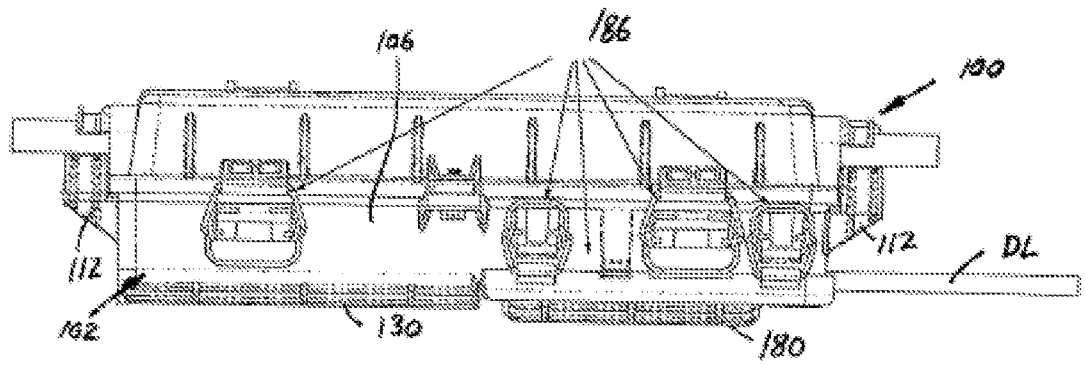
FIG. 6 is an elevational view of the combination closure illustrating the latch and lockout features for the covers.
Figure 7:
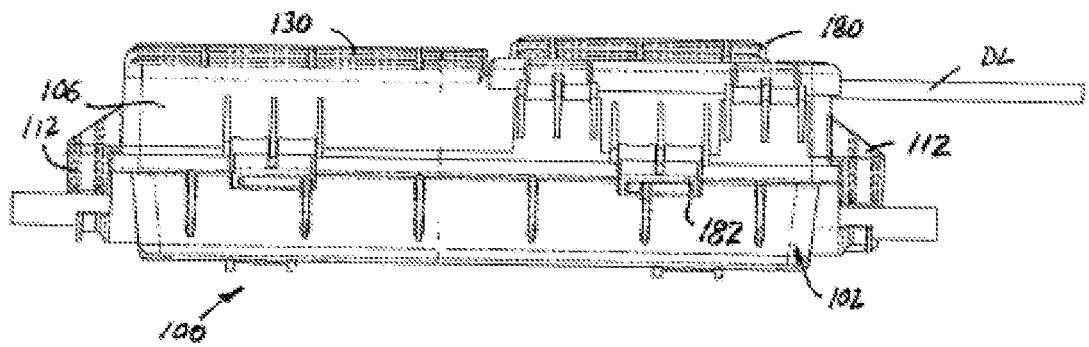
FIG. 7 is an elevational view of the combination closure illustrating the hinged closure for the distribution access portion.
Figure 8:
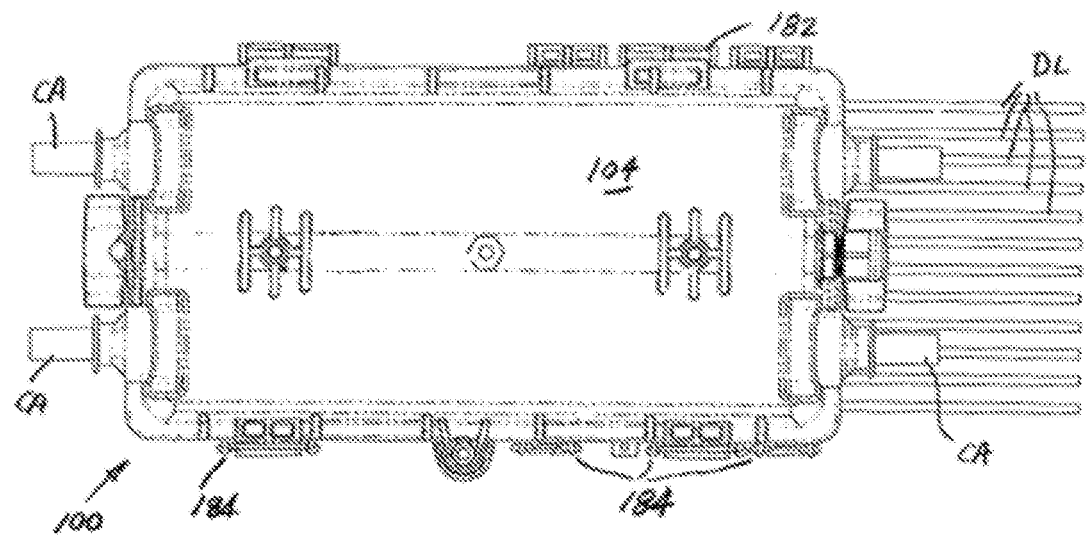
FIG. 8 is a bottom plan view of the combination closure.
Figure 9:
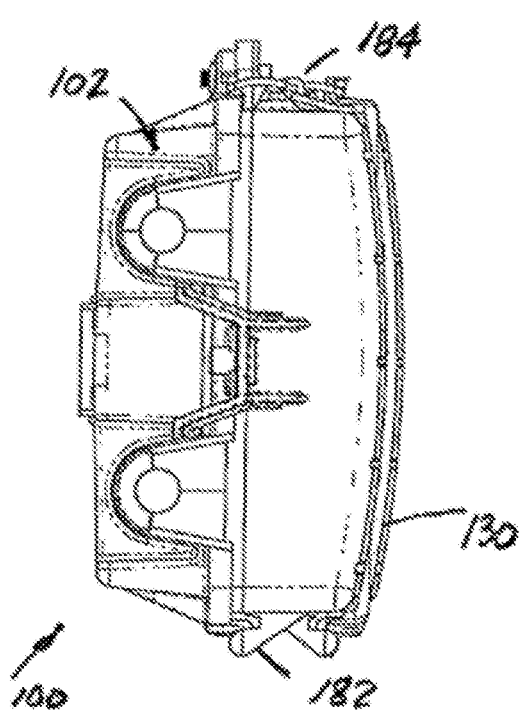
FIG. 9 is an end view of the combination enclosure taken generally from the left-hand end of FIG. 5.
Figure 10:
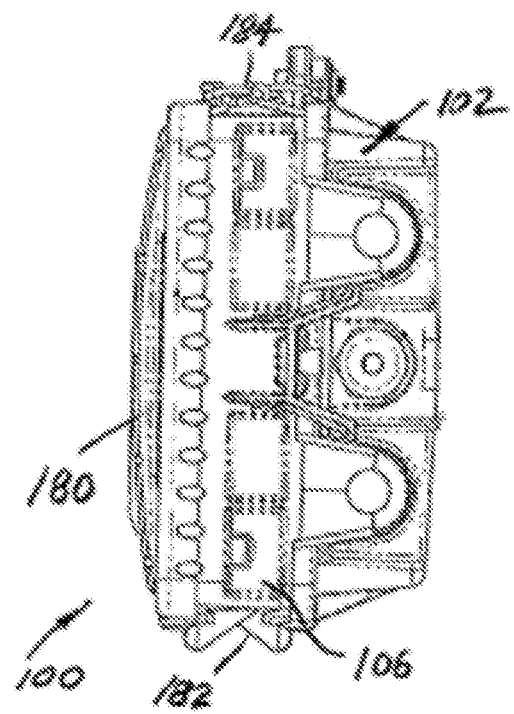
FIG. 10 is an end view of the combination closure taken generally from the right-hand end of FIG. 5.

The connector closure 100 is generally divided into first and second compartments 114, 116 by a separation or dividing wall 118 that extends in perpendicular fashion from the base wall 104 at a location between end portions of the sidewall 106 (FIG. 3). More particularly, the first compartment 114 defines a patch portion of the connector closure 100 that is selectively closed by a cover 130. Preferably, the cover 130 is designed to be permanently closed (i.e. semi-permanently closed) to limit access to the patch portion 114 of the connector closure 100 by authorized personnel only. For example, the cover 130 is preferably secured via fasteners such as mounting screws that extend through elongated bosses 132 extending upwardly from the base wall 104 of the patch portion 114 of the connector closure 100. Thus, a sealing member or gasket 134 is provided on the underside perimeter portion of the cover 130 or along the upper perimeter edge of the sidewall 106 (e.g., an integrated over-molded gasket) that receives and supports a perimeter of the cover 130 in order to provide desired sealing between the connector closure 100 and the cover from the external environment when the cover is mounted in place. Further, the first compartment 114 includes first and second service ports cable assembly input sections 140 adapted to receive first and/or second cable assemblies CA. Particularly, the cable assembly input sections 140 each include a partial sleeve 142 that partially covers a recess or opening 144 (FIGS. 3-4). The partial sleeve 142 has an inner surface that conforms to the outer cylindrical surface or contour of the cable assembly CA. A removable plate 150 (FIG. 13) on the base 104 receives a round or flat seal arrangement of the input cable. Once the input cable is inserted beneath the partial sleeve 142 into the associated recess 144, the plate 150 (FIG. 13) is secured to the base wall 104 to secure the perimeter of the cable CA and resist pullout forces. This arrangement provides for entry of the cable(s) CA into the closure 100 in a direction that is in substantially the same plane as the base wall 104, and provides for ease of entry into the patch portion 114 of the connector closure (FIG. 3), and also assures that the cable assemblies are secured against pullout forces and additionally sealed relative to the external environment. Still other strain relief mounting structure can be employed to enhance the retention of the cable assemblies CA within the closure 100.

Disposed on the other side of the dividing wall 118 of the base 102 of the connector closure 100 is the second compartment 116 (FIGS. 3-4) used as a distribution access compartment for storing and/or connecting connectorized ends of individual, single fiber drop lines DL. By way of example, terminal connectorized ends of individual drop lines DL are shown in these figures, although a greater or lesser number of drop lines can be accommodated and received in the connector closure 100 as necessary. Specifically, a modular, push-to-connect connector 160 is provided on the end of each of the drop lines DL for mating receipt with an associated push-to-connect receptacle 162 mounted in the dividing wall 118, and as particularly evident in FIGS. 3-4, the receptacle is to a limited to receive push-to-connect connectors on both sides of the receptacle. This simplifies the connection of the individual drop lines DL with an associated fiber that is connected to a receptacle 162 mounted in a bulkhead 164 from the patch portion 114 of the connector closure 100 and that connect with an associated receptacle 166 (FIG. 4) in the patch portion/first compartment 114 of the closure. The second compartment 116 acts as a "covered parking lot" for the individual drop lines DL that may not be connected to a receptacle 162. The disconnected connectors 162 are no longer exposed to the elements and instead are protected from the external environment within the second compartment 116. In addition, a field accessible cover or door 180 is mounted or hinged at 182 to the sidewall 106 along one edge of the distribution access compartment 116. An opposite edge of the field accessible cover 180 preferably includes a pair of over-center draw latches or a similar latching assembly 184 that allows for ease of ingress and egress to the distribution access compartment 116. If desired, a tamper tag lockout 186 can also be added adjacent the latching assembly to allow ready indication whether unauthorized entry has been made to the distribution access compartment 116. It is understood that any cover capable of an open state and a closed state may be used to allow or prevent access to a compartment, respectively. These covers include but are not limited to a single door with at least one hinged, multiple opposing doors, covers a slight on-off against the base, etc.—alternatives which are not as preferred but fall within the scope and intent of the present disclosure.

Figure 14:
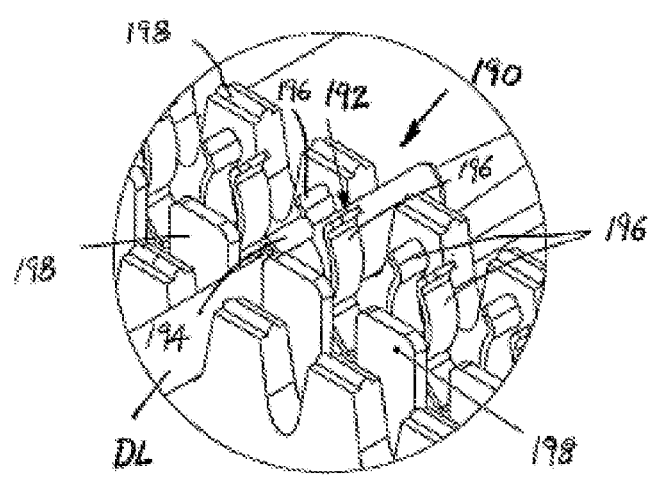
FIG. 14 is an enlarged perspective view of a strain relief/seal region of the combination closure of FIG. 1 that receives individual drop lines.

The distribution access compartment 116 preferably includes a cable retention channel 190 that receives a strain relief clamp 192 associated with each of the drop lines DL (see FIGS. 2-4 and 11). The clamp 192 preferably includes first and second c-shaped portions 192a, 192b that surround a metal crimp 193 that includes an outwardly extending radial shoulder 194 (FIG. 14) that is axially located between retention fingers 196 that grip the periphery of the drop line DL. Shoulders 198 of the channel 190 further resist axial movement of the drop lines relative to the closure 100. Once positioned in place, the cable retention channel 190 is preferably filled with a seal material such as a gel or rubber-type sealant to preclude moisture and dust ingress into the distribution access compartment 116. In this manner, once the drop line(s) DL is/are installed into the proper drop slot of the retention channel 190 with the gel/seal, closing the cover 180 will axially lock the drop lines in the closure. Gel or any other cured material is used as a sealing mechanism for the distribution/drop cables in a fiber optic splice closure with or without mid span access. The cables would be directly installed/pushed (non-captive/captive) into/through the gel material without any need for additional effort to compress the gel material around the cable. The gel might be compressed with the door/cover closed. Non-captive gel pockets are preferably located in the base aligned with the installation door sections. The gel can be installed in either the base/Installation door only, or in both to create the proper designed sealing of the compartment/unit. There is sufficient strength provided by metal in the wall/shoulders 198 that form retention channel 190, and the crimp shoulder 194 of the clamp 192 provides additional strain relief to the drop lines DL while the seal provides the desired protection against the external environment. Still other crimp or fastening methodologies illustrated in the accompanying drawings may be used.

As will be appreciated and as illustrated in the various figures, disconnected ends or connectors 160 on the individual drop lines DL are accommodated in the storage area provided by the distribution access compartment 116. In this manner, disconnected drop lines DL are no longer exposed to the external environment, which reduces the potential for damage (for example, where a disconnected drop line is otherwise blowing in the wind) until such time as a connection is required.

Figure 11:
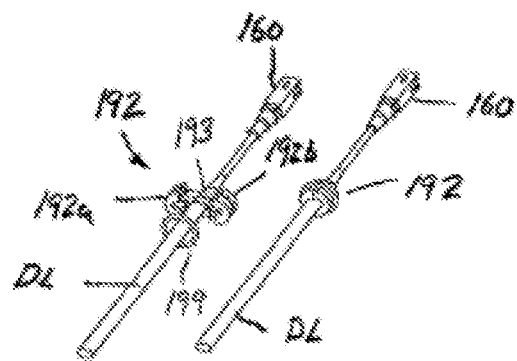
FIG. 11 is a perspective view of a strain relief clamp assembly for individual distribution or drop cables with a connector (the exploded left-hand view shows the clamp partially assembled, while the right-hand view shows the clamp assembled).

FIG. 11 illustrates further features of the strain relief assembly each of the fiber drop lines DL. In a preferred arrangement, the strain relief clamp 192 is formed by a pair of cooperating C-shaped portions 192a, 192b that when received over the outer diameter of a drop line DL, then press fit together and the clamp is received within the retention channel 190. In addition to the sealant in the retention channel 190, a seal ring or o-ring 199 may also be placed over the outer diameter of the drop line DL adjacent the strain relief clamp 192 to limit the potential for ingress of any dust or moisture along the interface between the drop line and the strain relief clamp, in addition to holding the c-shaped clamp portions 192a, 192b together.

Figure 15:
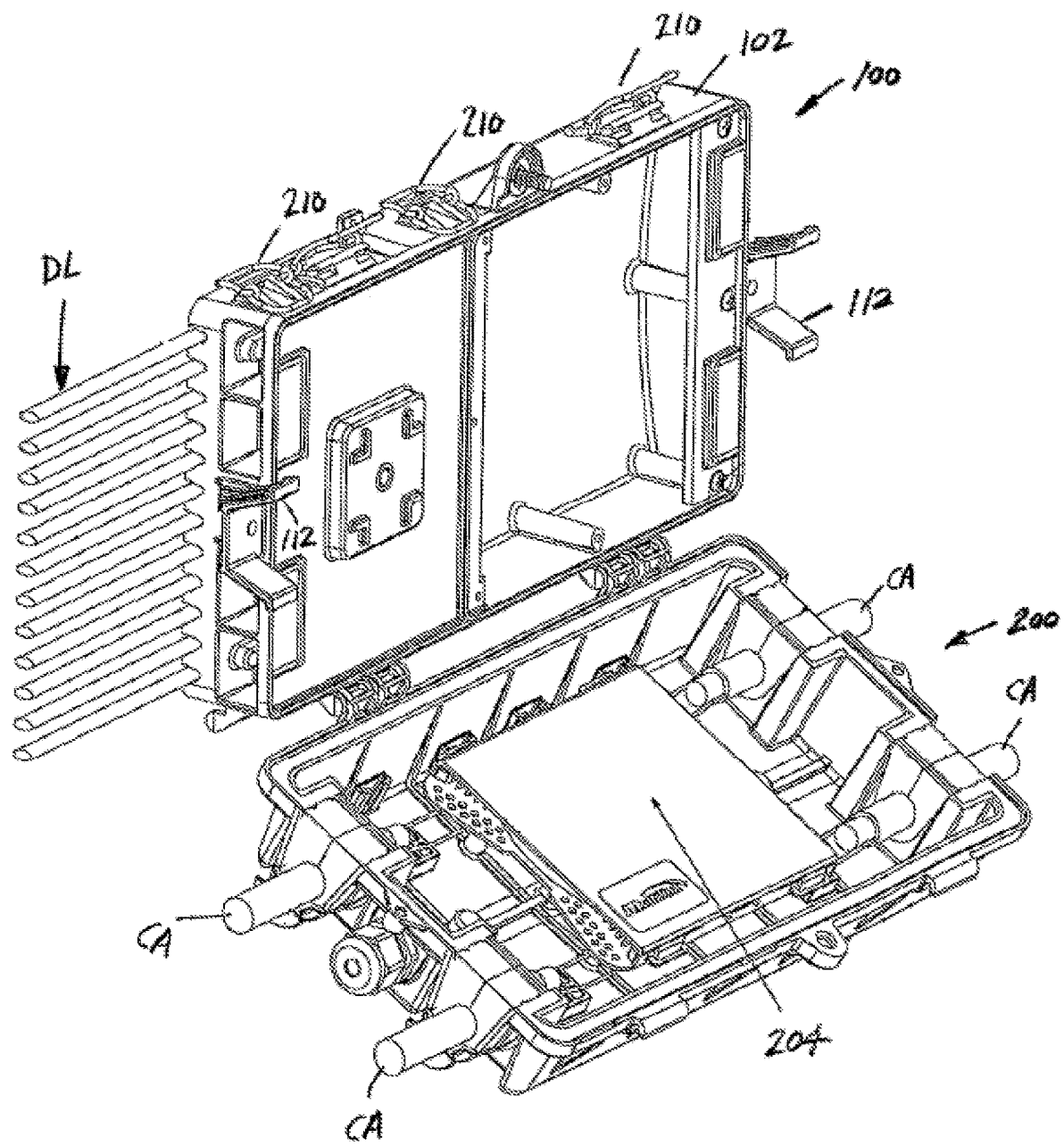
FIG. 15 is a perspective view of the combination closure with a splice enclosure hingedly secured to the bottom of the combination closure.
Figure 16:
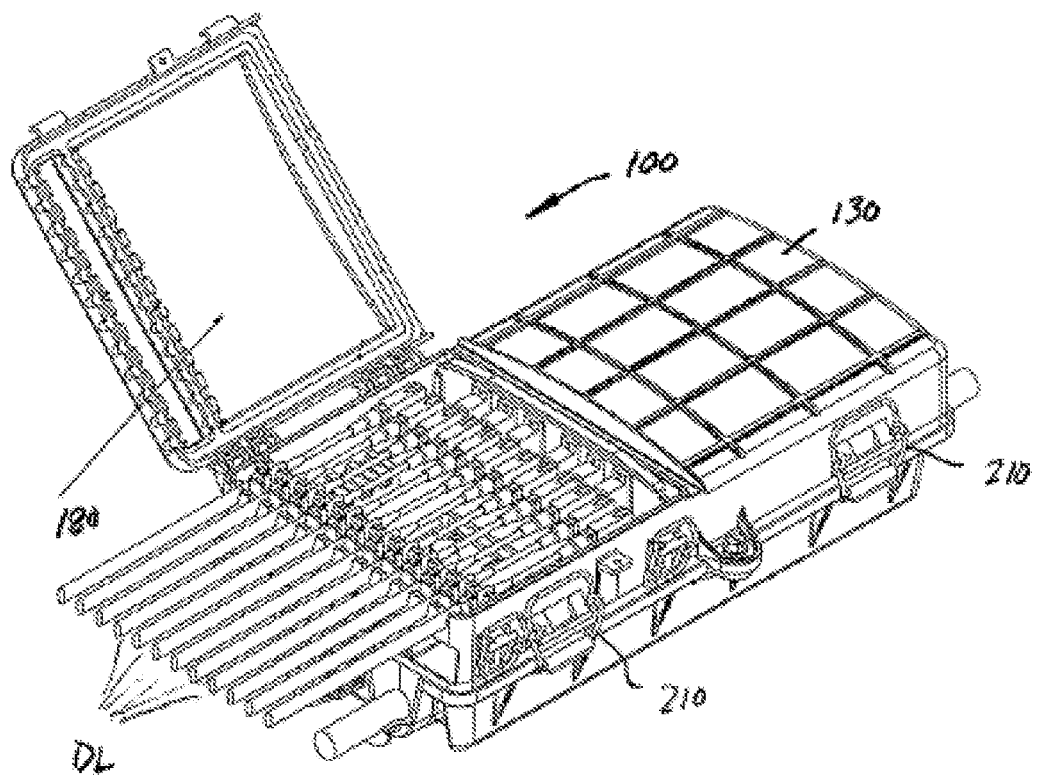
FIG. 16 is another perspective view of the combination closure with the splice closure.
Figure 17:
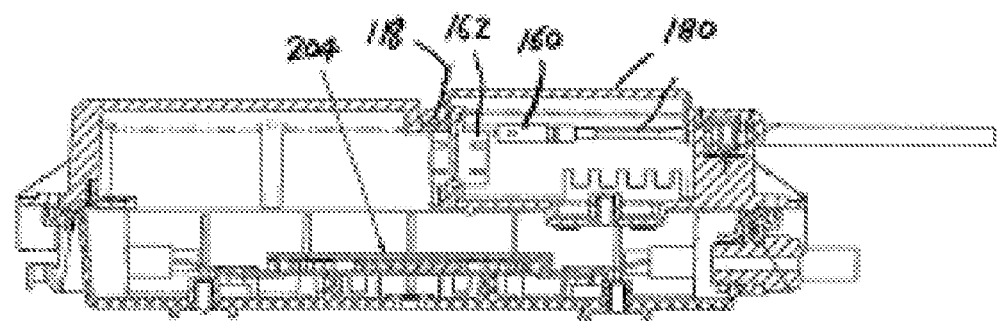
FIG. 17 is a longitudinal cross-sectional view of the combination closure and splice closure of FIGS. 15 and 16.

FIGS. 15-17 illustrate how the connector closure 100 can be piggybacked to a conventional splice case 200. In this manner, the connector closure 100 is part of a modular arrangement where splicing can be completed in a well-known, conventional manner in the splice closure 200 and a knockout panel 202 provided in the base wall 104 of the connector closure 100. The knockout panel 202 provides suitable access to feed individual fibers lines from the splice tray 204 in the splice enclosure 200, through an opening in the base wall 104 when the knockout panel is removed. As will be appreciated, one edge of the splice enclosure 200 can be modified so that the splice enclosure is mounted (e.g., hinged) to the connector closure 100 described in connection with FIGS. 1-10. Similarly, over center draw latch assemblies or another type of latch arrangement 210 can be provided to secure the connector enclosure 100 to the splice enclosure 200. With the above description/options the unit becomes a field upgradeable, modular in design unit with the capabilities of a mid-span access with/without fiber splicing.

FIGS. 18A-18G illustrate a cross connect closure with twelve fiber drop distribution cable ports provided at a first end of the housing. A field accessible door is provided at that end of the housing, preferably hinged along one side and selectively latched at the opposite side when the doors in a closed position. As evident in FIGS. 18B and 18F, pole/wall mounting bosses extend outwardly from the bottom surface of the housing. Further, a service entry port is shown extending through the bottom surface of the housing. As previously noted, the bottom plate is removable via fasteners such as mounting screws, so that the bottom surface may be rotated 180° to prepare the closure for aerial mounting configuration.

Figure 19:
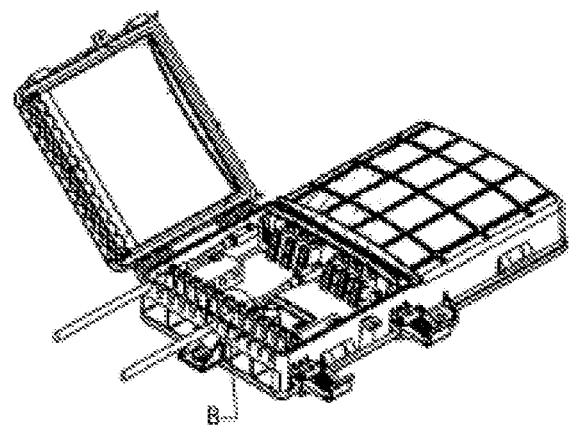
Figure 19B:
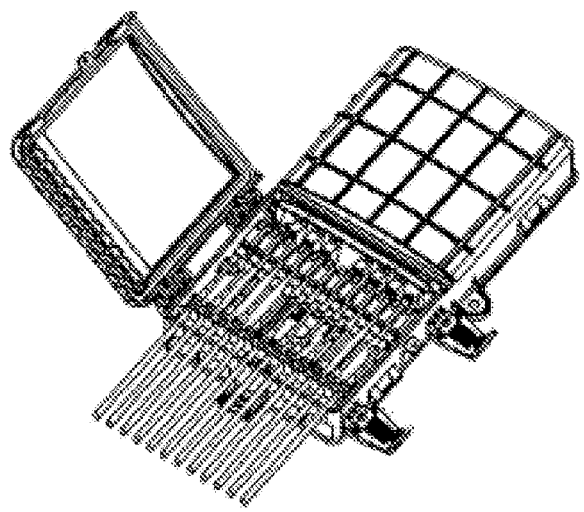
Figure 19C:
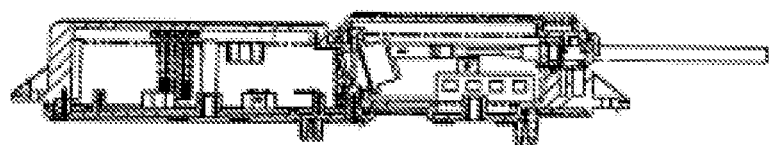
Figure 20A:
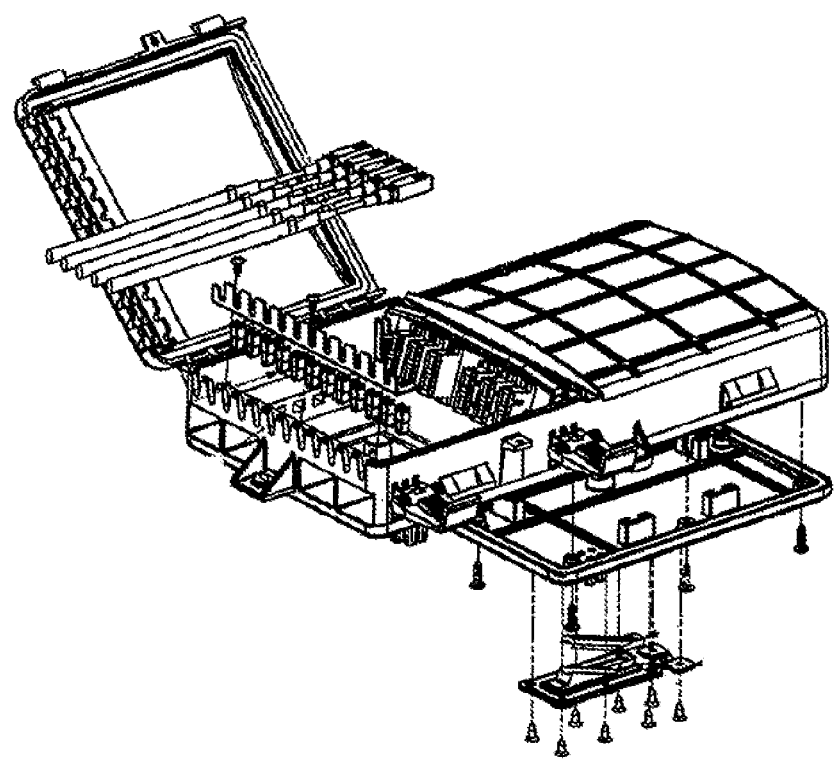
Figure 20B:
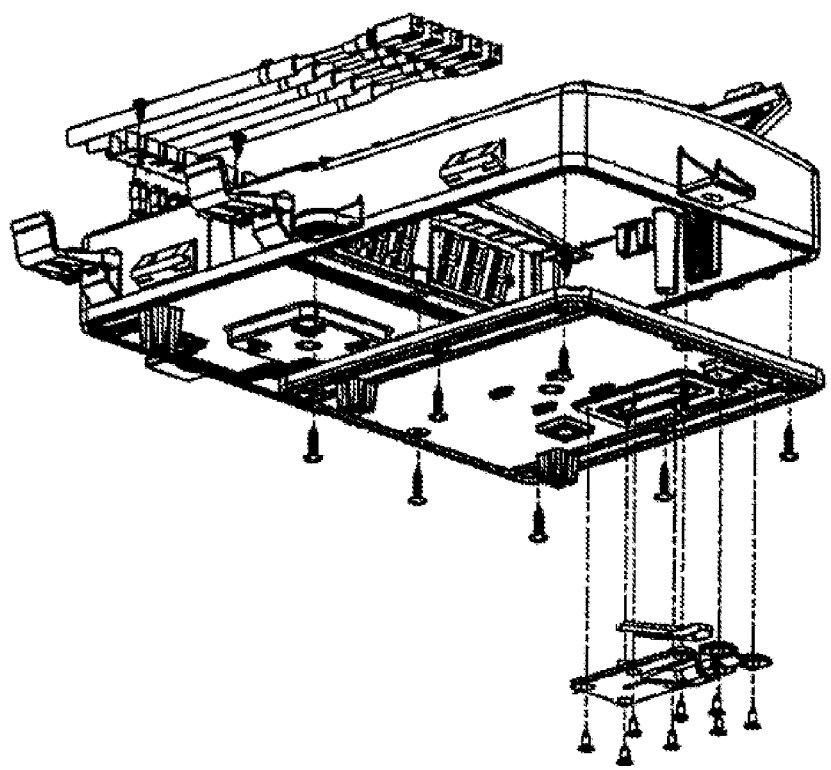
Figure 20C:
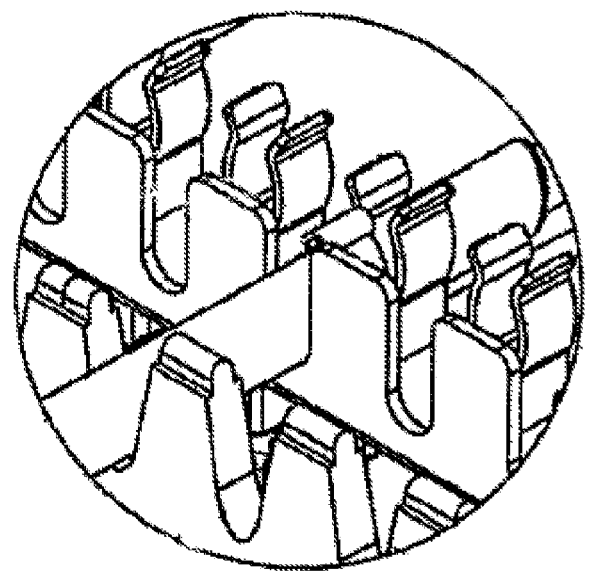
Figure 20D:
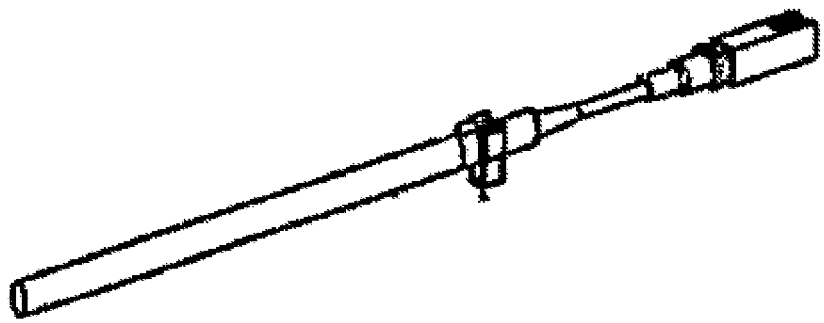
Figure 20E:
Figure 21A:
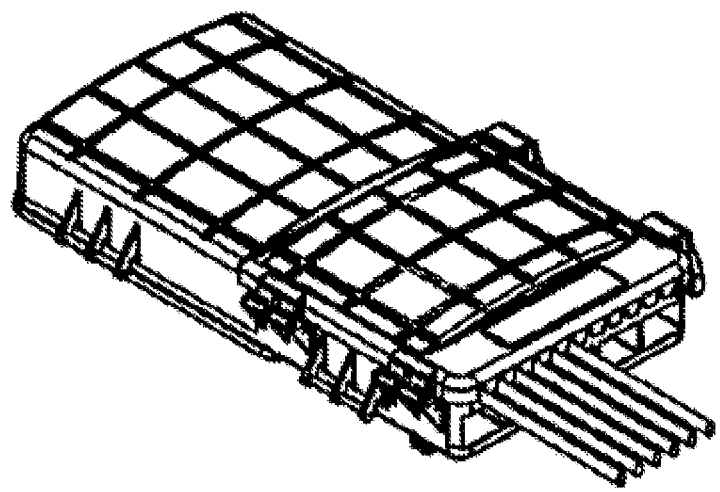
FIGS. 21A-21F (perspective closed, perspective open, front, bottom, right side, and cross-sectional views along the lines C-C of FIG. 21D) show additional views of a termination enclosure for a pedestal configuration.
Figure 21B:
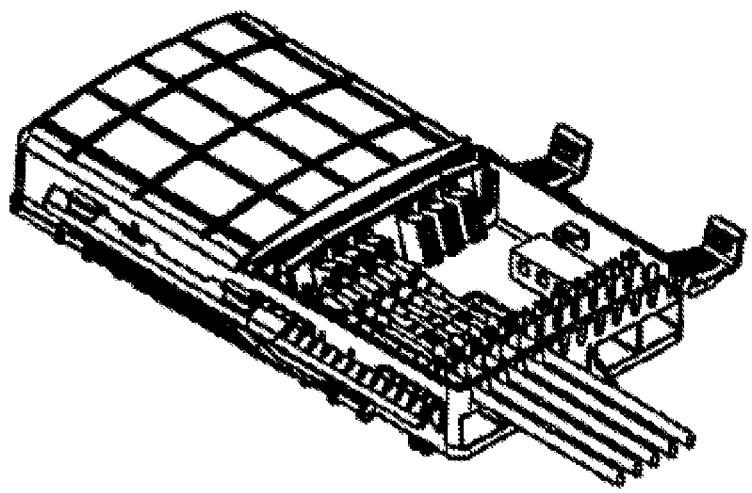
Figure 21C:
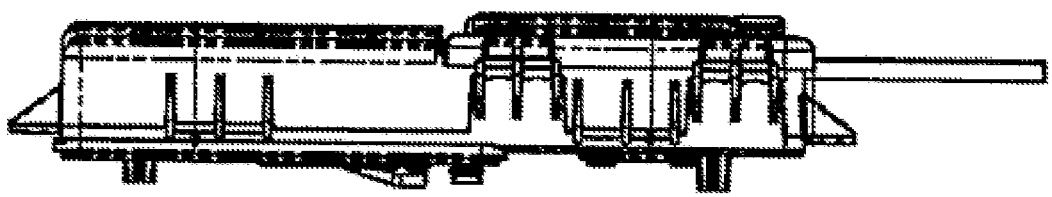
Figure 21D:
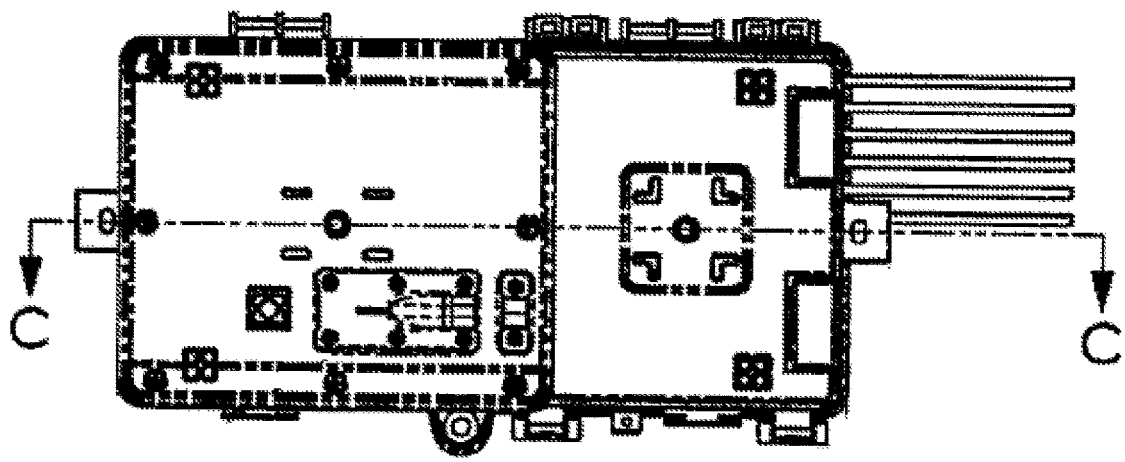
Figure 21E:
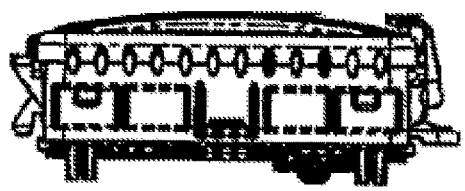
Figure 21F:
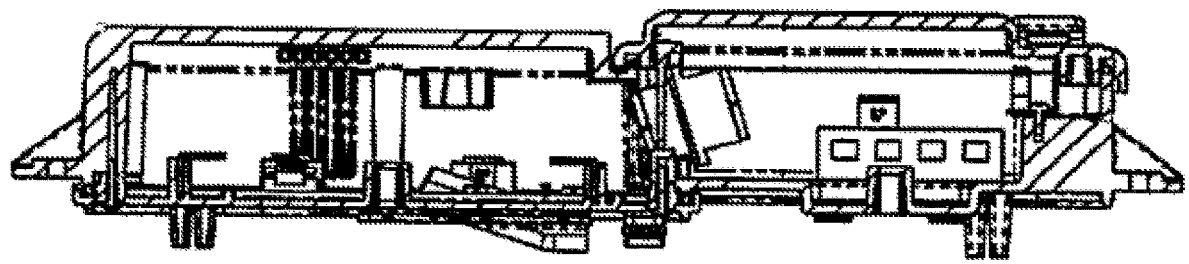
Figure 22A:
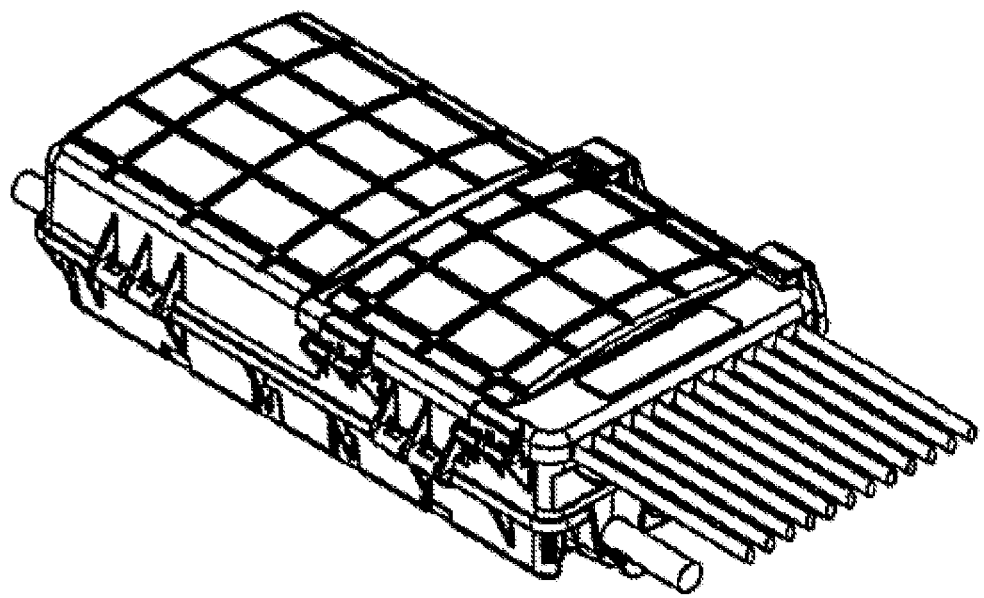
FIGS. 22A-22G (perspective, front, rear, top, bottom, left side, and right side views), 23A-23D, 24A, and 24B (disassembled perspective and assembled perspective views) illustrate additional views of the termination enclosure with a splice enclosure.
Figure 22B:
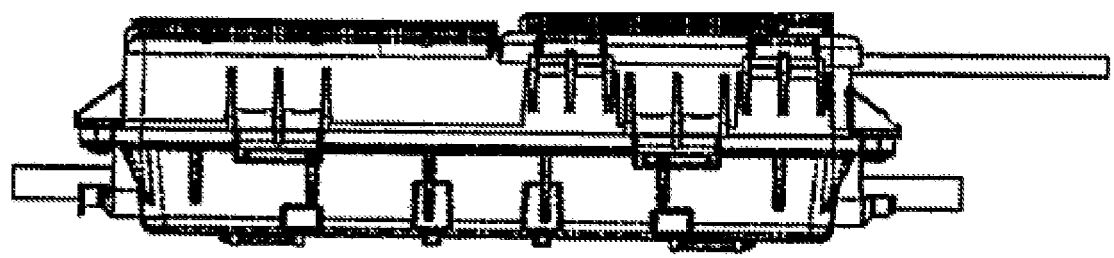
Figure 22C:
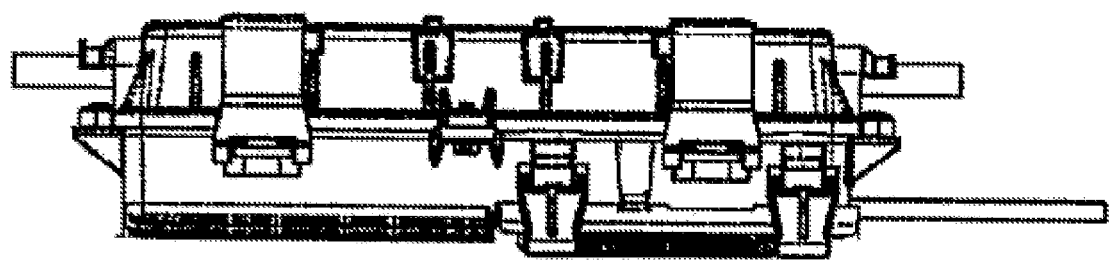
Figure 22D:
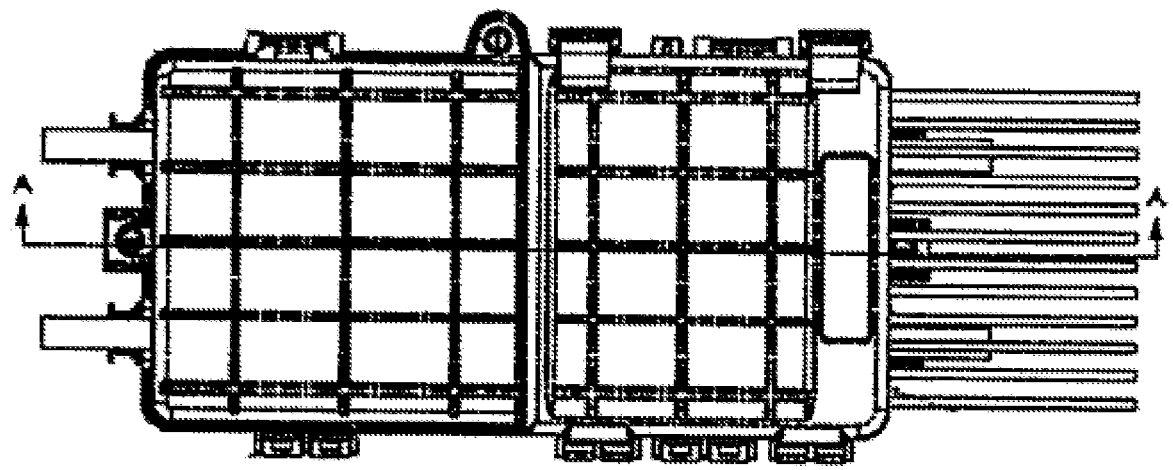
Figure 22E:
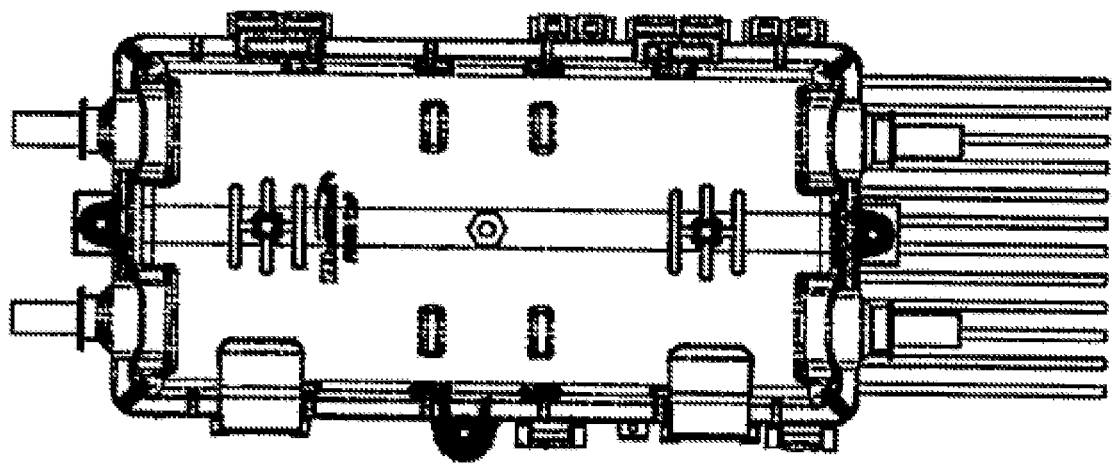
Figure 22F:
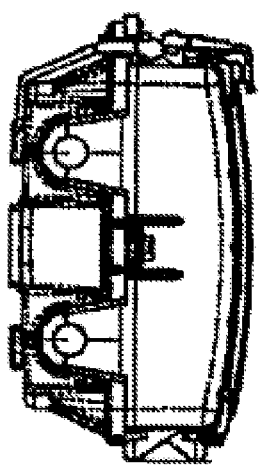
Figure 22G:
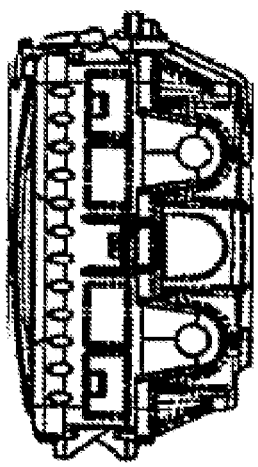

FIGS. 19A-19C illustrate the field and recover in the open position. This allows access to the compartment that holds the individual fiber drop lines, which may be individually connected with the adapters within the compartment. The underside of the cover includes a perimeter gasket such as an overmolded gasket region to limit ingress of dirt and moisture to the compartment. Moreover, these views illustrate the cable retention channel formed adjacent the perimeter edge of the compartment. The channel includes strain relief clips and channel is filled with a gel or rubber-type sealant to keep moisture and dust out.

FIGS. 20A-20E illustrate further details of snap-in spring clips secured to the external surface of the fiber drop lines while the first compartment cover or door is open. For example, a metal cable crimp provided on the exterior of the fiber drop cable is useful as a part of the drop cable strain relief clamp. As particularly illustrated in FIG. 20C, the outer wall of the first compartment of the closure includes fiber drop cable grooves that receive the outer perimeter of an individual fiber drop cable and the cable proceeds inwardly into the first compartment. The grooves are generally u-shaped grooves that are useful to resist pullout forces. The individual fiber drop cable extends through similar u-shaped grooves in a metal retaining wall bracket. The metal bracket adds greater strength and rigidity against pullout forces. Further, at this entrance region of the individual fiber drop cable lines into the first compartment, there is provided a gel pocket that is filled after the items are all installed.

FIGS. 21A-21F illustrate the same general features in a pedestal mounting configuration.

Figure 23A:
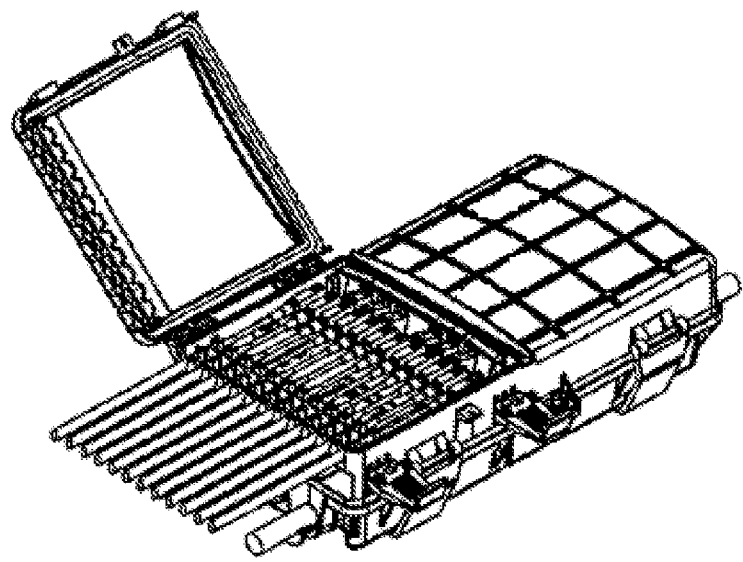
Figure 23B:
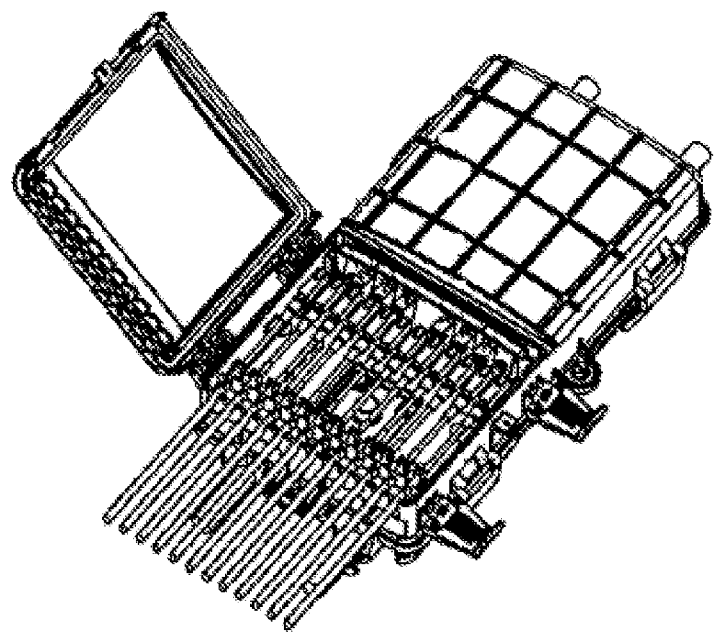
Figure 23C:
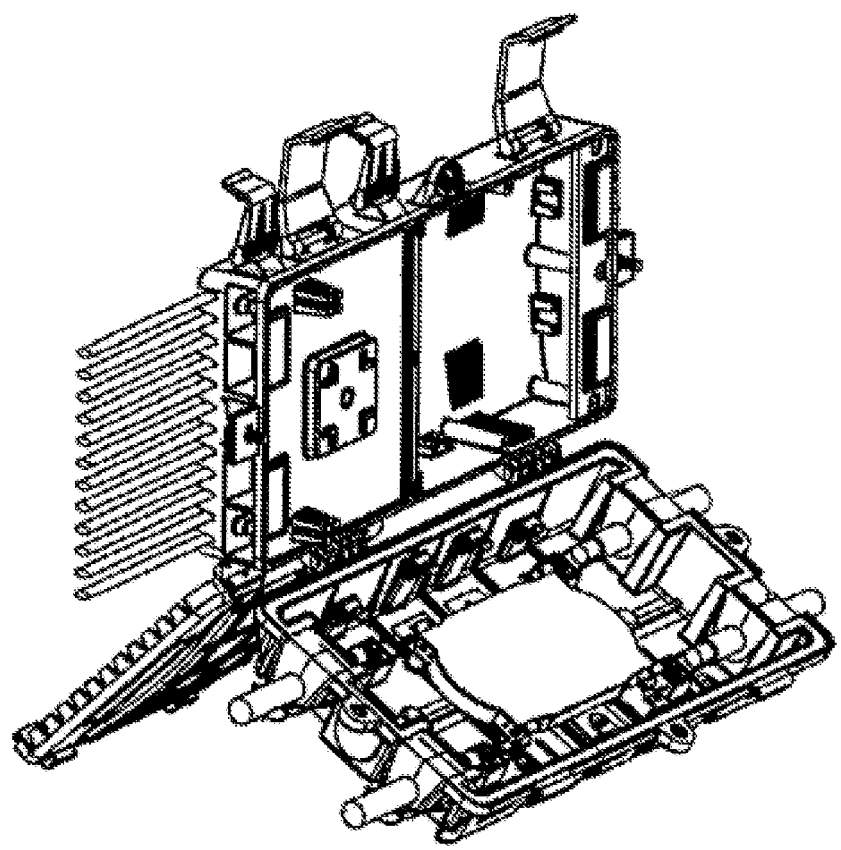
Figure 23D:
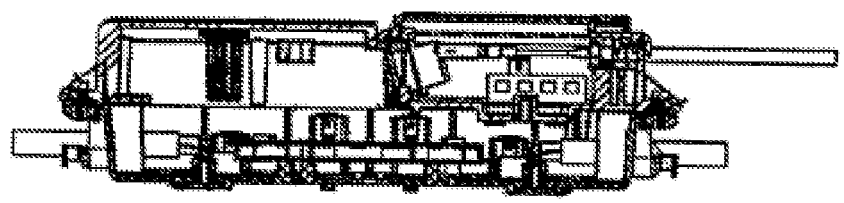
Figure 24A:
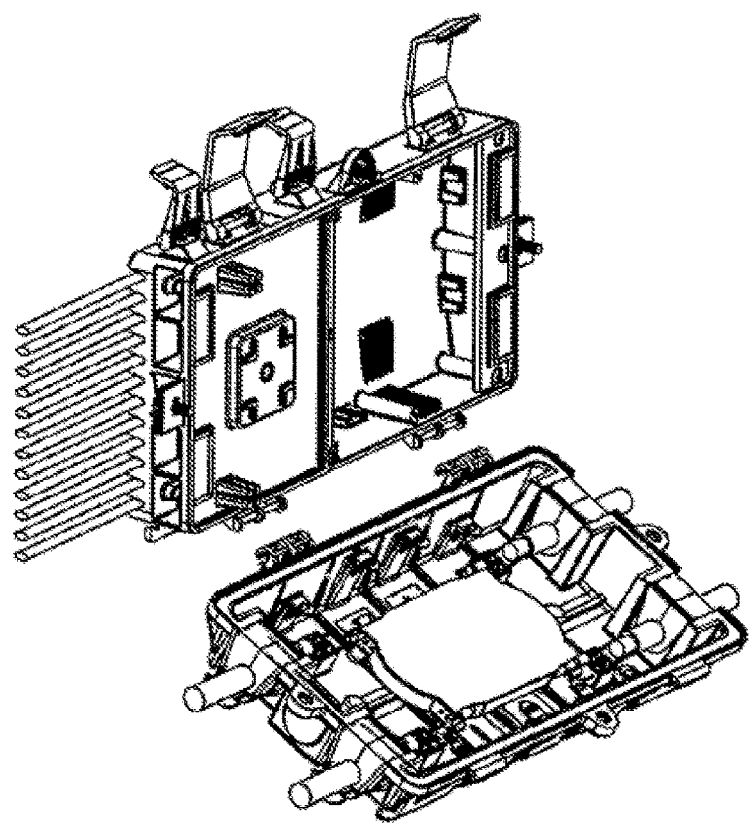
Figure 24B:
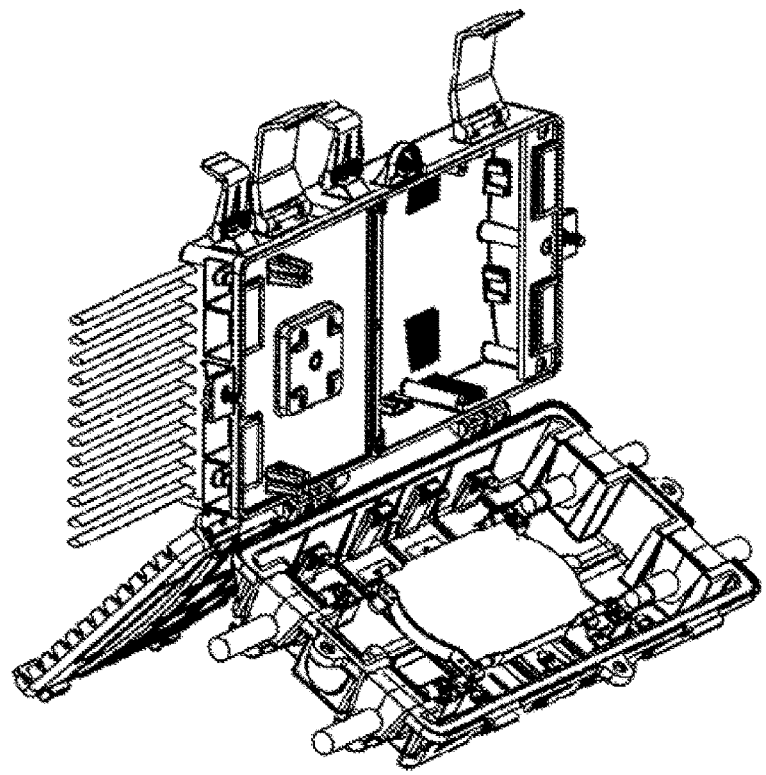
Figure 25A:
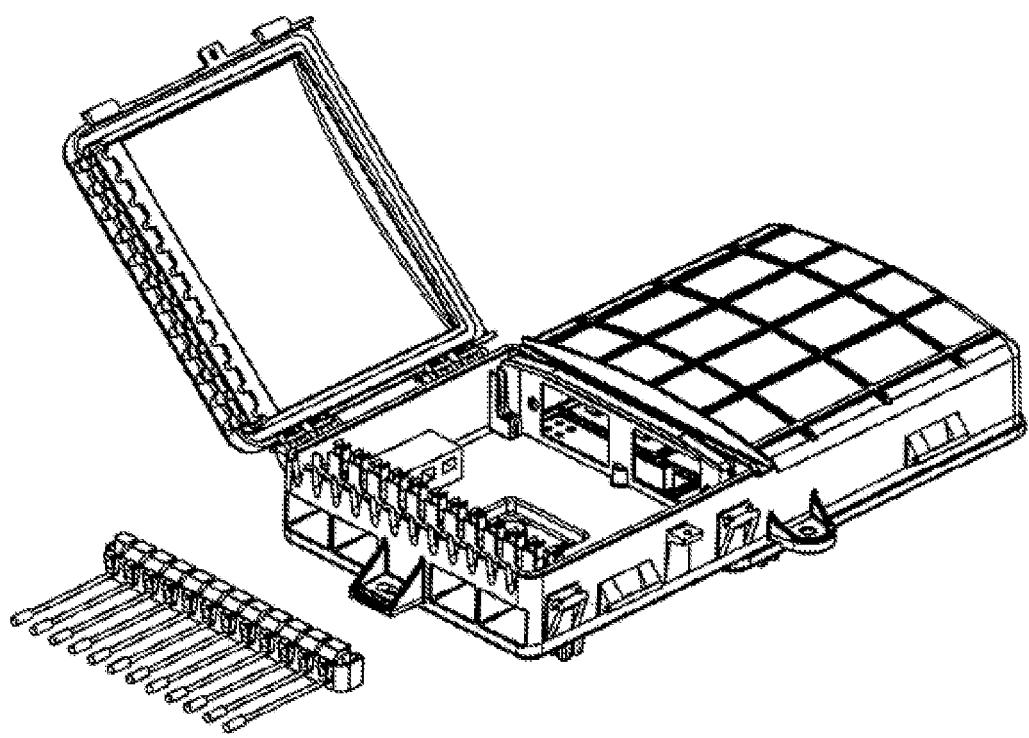
FIGS. 25A (open perspective view), 25B (closed perspective view), 26A (open perspective view), 26B (closed perspective view), and 27A-27D (end perspective views of the flat cable, and end and perspective views of the round cable, respectively) are views of the termination accommodating round cable grommets and flat drop grommets.
Figure 25B:
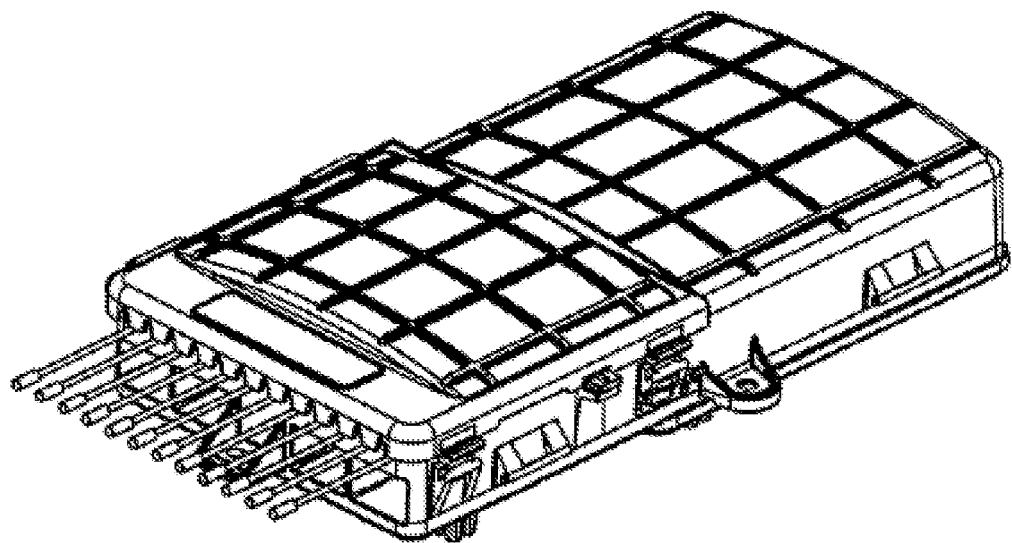
Figure 26A:
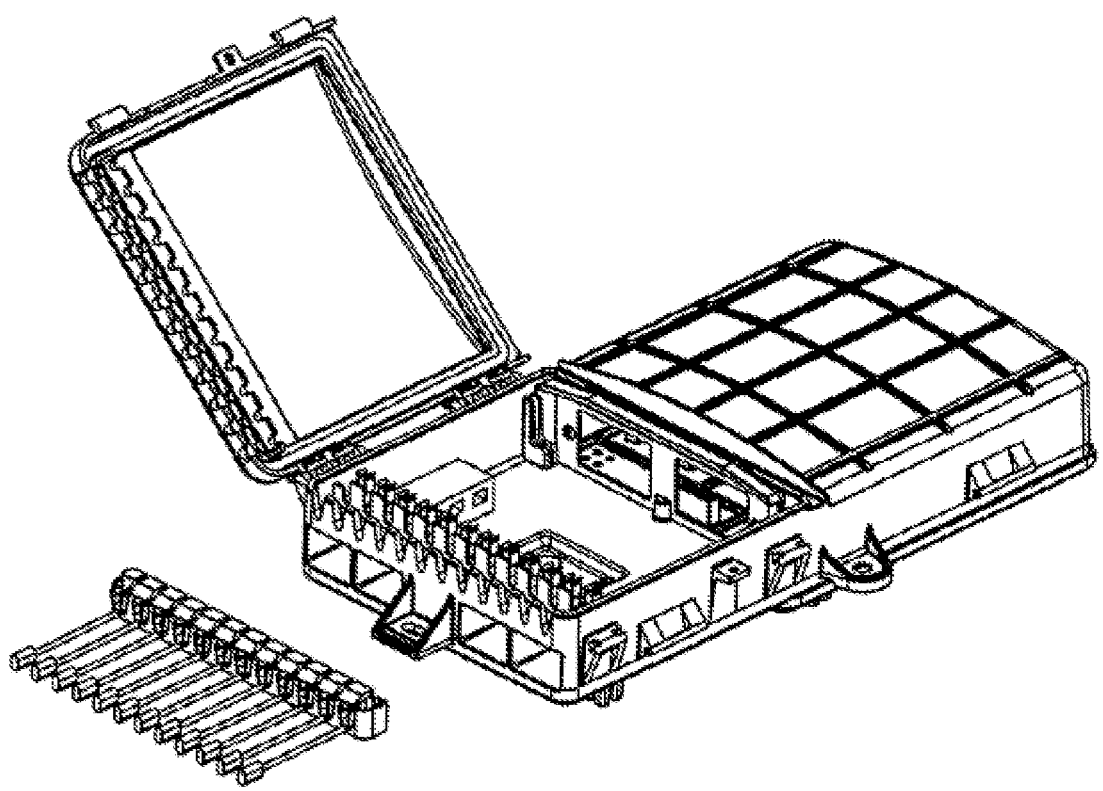
Figure 26B:
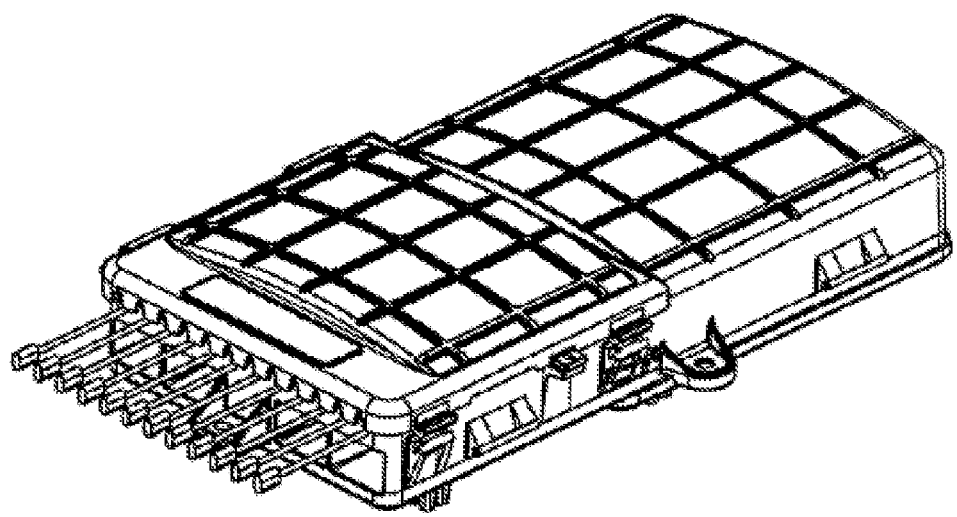
Figure 27A:
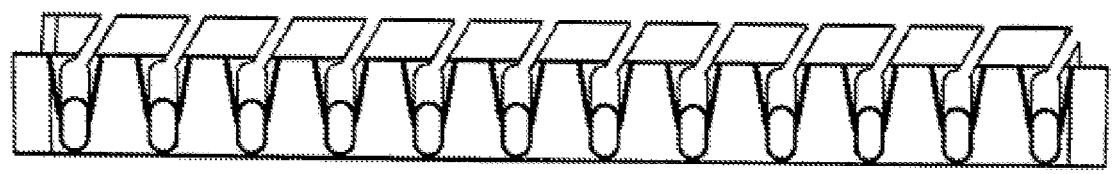
Figure 27B:
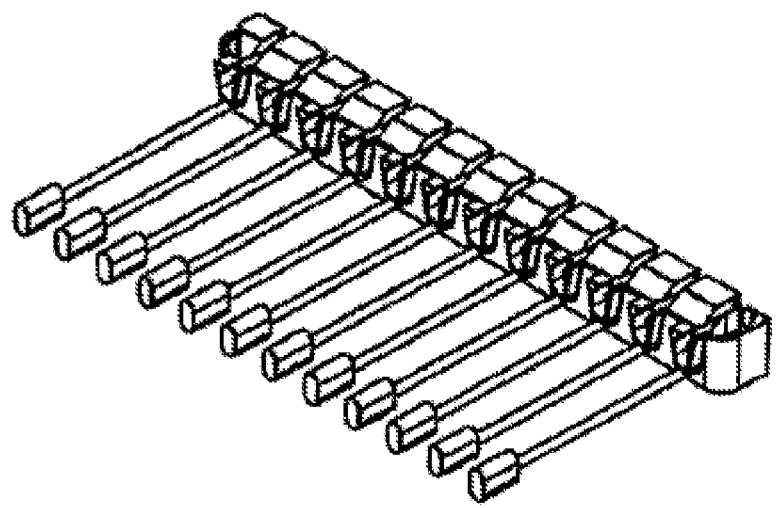
Figure 27C:
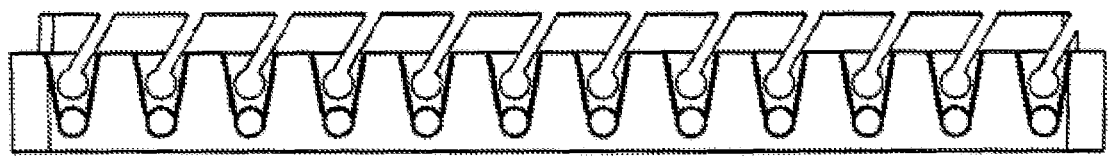
Figure 27D:
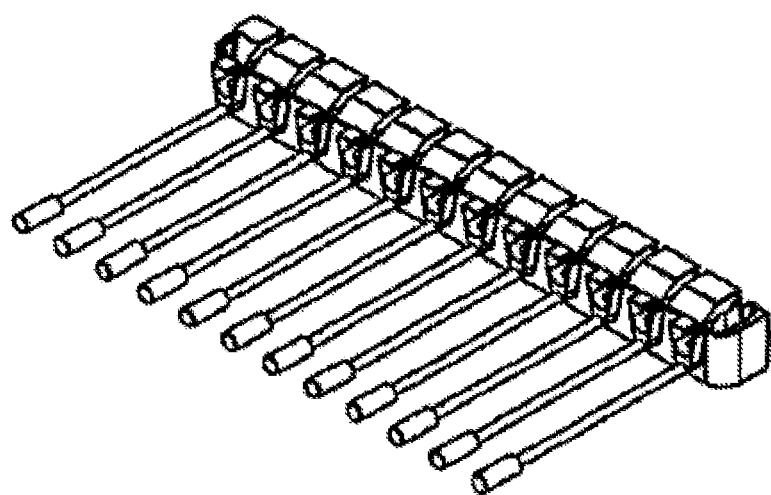

FIGS. 22A-22G, 23A-23D, and 24A-24B show one of the previously described connector closures used in conjunction with a splice enclosure. The splice enclosure is mounted to a lower portion of the connector closure as perhaps best illustrated in FIG. 23C. The fiber splice compartment can be an add on enclosure, for example, that snaps onto existing hinged knuckles of the termination enclosure described in the earlier embodiments. The fiber splice enclosure includes clips for orienting and organizing the individual splices, incorporation of a conventional splice tray, etc.

FIGS. 25A-25B, 26A-26B, and 27A-27D illustrate how different shaped flat or round cables can be incorporated into the assembly by modifying grommets that receive the perimeter of the individual drop lines.

Figure 28:
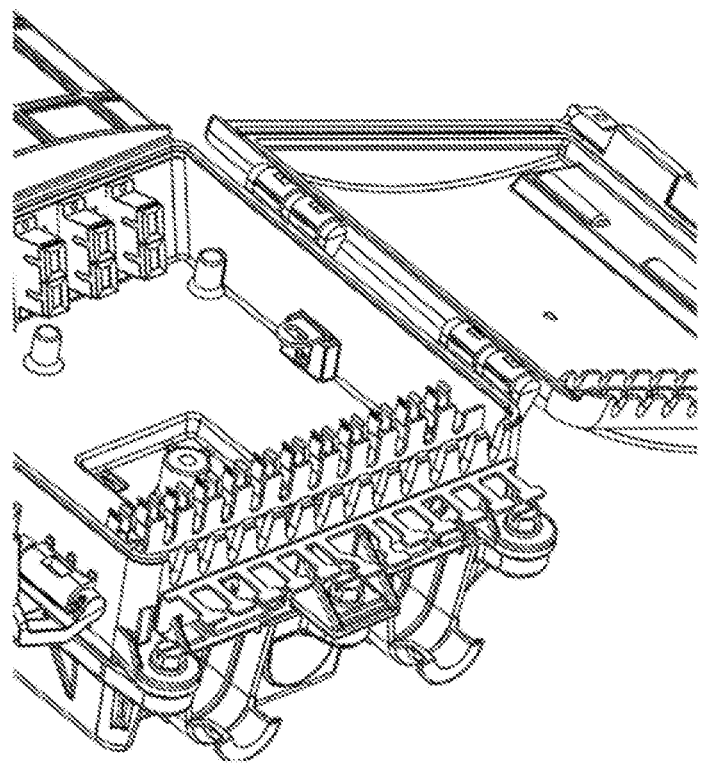
FIGS. 28-29 illustrate an external strain relief member secured to the outside of the housing.
Figure 29:
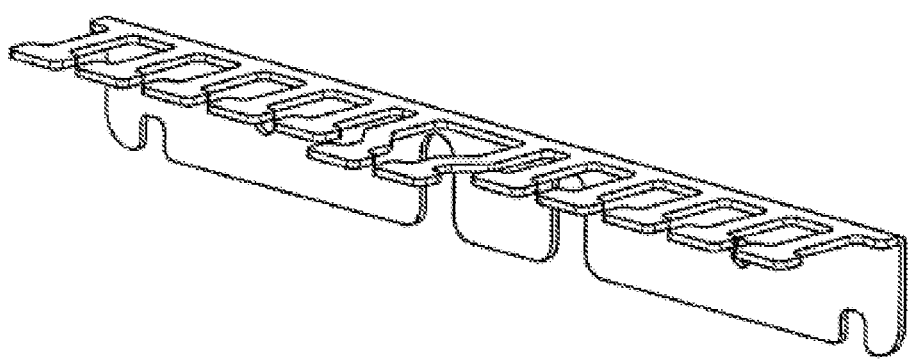

FIGS. 28-29 illustrate a modified connector closure that adds an additional strain relief component to the structure. Particularly, an external (preferably metal) strain relief bracket is shown in FIG. 29 and incorporated on or mounted to the closure (FIG. 28). The portion (first leg) of the bracket that abuts along the outer surface of the closure may include a series of grooves or recesses that receive gussets or strengthening ribs on the outside of the closure and limit movement of the bracket relative to the closure, and/or one or more openings that receive respective fasteners to secure the bracket of FIG. 29 onto the closure adjacent the existing internal strain relief structural arrangement described in connection with earlier embodiments. Further, one of the recesses on the second portion (second leg) of the bracket are dimensioned to receive the individual drop lines therein. Specifically, as is common, each recess has a narrow region through which the outer perimeter of the individual drop lines is pushed through to a slightly larger region of the recess that receives the drop line. This provides further resistance to pull-out forces, and also provides improved organization of the multiple drop lines to orient the drop lines in a desired direction. One or more recesses could be slightly enlarged relative to the other recesses if desired to receive larger diameter cable therein.

This written description uses examples to describe the disclosure, including the best mode, and also to enable any person skilled in the art to make and use the disclosure. Other examples that occur to those skilled in the art are intended to be within the scope of the invention if they structural elements that do not differ from the same concept, or if they include equivalent structural elements with insubstantial differences.

What is claimed is:

1. A modular connector closure for attachment to a splice case comprising:
    a first compartment, a second compartment, and a splice compartment;
    the first and second compartment form a body portion adapted to attach to cover the splice compartment comprising a first base wall and a first sidewall, wherein the first sidewall extends around and perpendicularly from an external perimeter of the base wall;
    a separation wall extending from and perpendicular to the first base wall forms the first compartment and the second compartment defined by the first base wall, the first sidewall, and the separation wall;
    the body portion attaches to the bottom splice compartment via at least one hinge, such that the connected body portion and splice compartment has an open state and a closed state;
    the bottom splice compartment comprising a splice tray and at least one of fiber management features; a second base wall, a second side wall, wherein the second sidewall extends around and perpendicularly from an external perimeter of the base wall;
    a removable knockout panel provided in the base wall, wherein the removal of the knockout panel provides an opening in the base wall to access components in the splice compartment from the first compartment;
    the second compartment comprises at least one associated distribution component;
    at least one connector receptacle mounted in the separation wall that establishes a signal connection between an associated cable accessible in the first compartment to an associated distribution component located in the second compartment;
    a first cover that encloses the first compartment and a second cover that encloses the second compartment, wherein the second cover is hinged to the sidewall such that the second cover has an open state allowing access to the second compartment and a closed state preventing access to the second compartment; and
    the second base wall is selectively configurable such that it can be rotated for mounting in one of first and second orientations for alternate mounting configurations.

2. The connector closure of claim 1 further comprising at least one cable input port in the first compartment configured to receive an associated cable assembly through an aperture in the base portion.

3. The connector closure of claim 2 wherein the at least one cable input port further comprises a partial sleeve including an inner surface that conforms to part of an outer contour of the associated cable assembly, a removable cable plate incorporated into the base wall with a portion configured to conform to part of the outer contour of the associated cable assembly, and wherein once an associated cable is inserted into the aperture, the removable cable plate is secured to the base wall to secure the associated cable between the partial sleeve and cable plate.

4. The connector closure of claim 2 further comprising at least one drop line used as an associated distribution component.

5. The connector closure of claim 2, further comprising at least one connector receptacle mounted in the separation wall where the receptacle establishes a signal connection between a cable of the associated cable assembly located in the first compartment with an associated distribution component located in the second compartment wherein the at least one connector receptacle is a push-to-connect connector.

6. The connector closure of claim 2 further comprising a plurality of cable retention channels adapted to accommodate an associated distribution component.

7. The connector closure of claim 6 further comprising a sealant disposed in the cable retention channels, wherein the seal and prevents moisture and dust ingress into the second compartment.

8. The connector closure of claim 7 wherein the sealant is further adapted to surround a perimeter of an associated distribution component and conform to a contour for receipt in a cable retention channel.

9. The connector closure of claim 2 further comprising an external strain relief mounted to an external surface of the body.

10. The connector closure of claim 1 wherein the first base wall is a removable base plate including a connector that secures the removable base plate to the sidewall.

11. The connector closure of claim 1 further comprising a first sealing member provided on an underside perimeter portion of the first cover.

12. The modular connector closure for attachment to a splice case of claim 1, further comprising a plurality of cable retention channels adapted to accommodate an associated distribution component.

13. The modular connector closure for attachment to a splice case of claim 12, further comprising a sealant in the cable retention channels that prevents moisture and dust ingress into the second compartment.

14. The modular connector closure of claim 1 wherein the body portion includes a fastener to secure attachment in the closed state.

15. A modular connector closure for attachment to a splice case comprising:
- a body portion adapted to attach to cover a bottom splice case including, a base wall and a sidewall, wherein the sidewall extends around and perpendicularly from an external perimeter of the base wall;
- a removable knockout panel provided in the base wall, wherein the removal of the knockout panel provides an opening in the base wall to access components in the splice case from the connector closure;
- a separation wall extending from and perpendicular to the base wall that forms a first compartment and a second compartment defined by the base wall, sidewall, and the separation wall, the first compartment providing access to the bottom splice case, and the second compartment including at least one associated distribution component;
- at least one connector receptacle mounted in the separation wall that establishes a signal connection between an associated cable accessible in the first compartment to an associated distribution component located in the second compartment; and
- a first cover that encloses the first compartment and a second cover that encloses the second compartment, wherein the second cover is hinged to the sidewall such that the second cover has an open state allowing access to the second compartment and a closed state preventing access to the second compartment; and
- a selectively configurable bottom wall that can be rotated for mounting in one of first and second orientations for alternate mounting configurations, or an external strain relief mounted to an external surface of the body.

* * * * *